(12) United States Patent
Reddy

(10) Patent No.: US 7,114,492 B2
(45) Date of Patent: Oct. 3, 2006

(54) METHOD AND SYSTEM OF PURGING EVAPORATIVE EMISSION CONTROL CANISTER USING HEATED PURGE AIR

(75) Inventor: Sam R. Reddy, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/106,115

(22) Filed: Apr. 14, 2005

(65) Prior Publication Data

US 2006/0065253 A1    Mar. 30, 2006

Related U.S. Application Data

(60) Provisional application No. 60/614,135, filed on Sep. 29, 2004.

(51) Int. Cl.
*F02M 55/02* (2006.01)
(52) U.S. Cl. ............... 123/518; 123/519; 123/520
(58) Field of Classification Search ........... 123/516, 123/518, 519, 520
See application file for complete search history.

(56) References Cited

U.S. PATENT DOCUMENTS

| | | | | |
|---|---|---|---|---|
| 4,598,686 A | * | 7/1986 | Lupoli et al. ............... | 123/519 |
| 4,778,495 A | * | 10/1988 | Bishop et al. .............. | 96/141 |
| 4,864,103 A | * | 9/1989 | Bishop et al. .............. | 96/141 |
| 5,021,071 A | * | 6/1991 | Reddy ....................... | 95/106 |
| 5,207,734 A | * | 5/1993 | Day et al. .................. | 60/278 |
| 5,377,644 A | * | 1/1995 | Krohm ...................... | 123/520 |
| 5,687,697 A | * | 11/1997 | Ishikawa ................... | 123/520 |
| 6,098,601 A | * | 8/2000 | Reddy ....................... | 123/520 |
| 6,105,708 A | * | 8/2000 | Amano et al. ............. | 180/309 |
| 6,230,693 B1 | * | 5/2001 | Meiller et al. ............. | 123/519 |
| 6,279,548 B1 | * | 8/2001 | Reddy ....................... | 123/520 |

\* cited by examiner

*Primary Examiner*—Thomas Moulis
(74) *Attorney, Agent, or Firm*—Kathryn A. Marra

(57) ABSTRACT

Method and system of purging evaporative emission control canister using heated purge air comprises a scrubber containing an activated carbon fiber material or carbon monolith selected to adsorb butane and/or pentane isomer vapors in low concentrations in air passing through the scrubber and to desorb the adsorbed butane and/or pentane isomers when purged with exhaust heated purge air. A method for reducing bleed emission to almost zero mg per day uses exhaust heated air purging of the scrubber.

20 Claims, 10 Drawing Sheets

Low Purge Hybrid
Move Scrubber to Warmer Location for 50°C

Extremely Low Purge Hybrid
Heat Exchanger to Heat Purge Air to 80°C

Simulated Exhaust Heated Air for Proof of Concept

Effectiveness of Exhaust Heated Air for Purging Zero Evap Hybrid Scrubber

Exhaust Heated Purge Air Had Little Effect on Purging of Zero Evap Hybrid Canister Exhausted Heated Purge Air Temperatures Exhausted Heated Purge Air-Purged Canister vs Loaded Canister

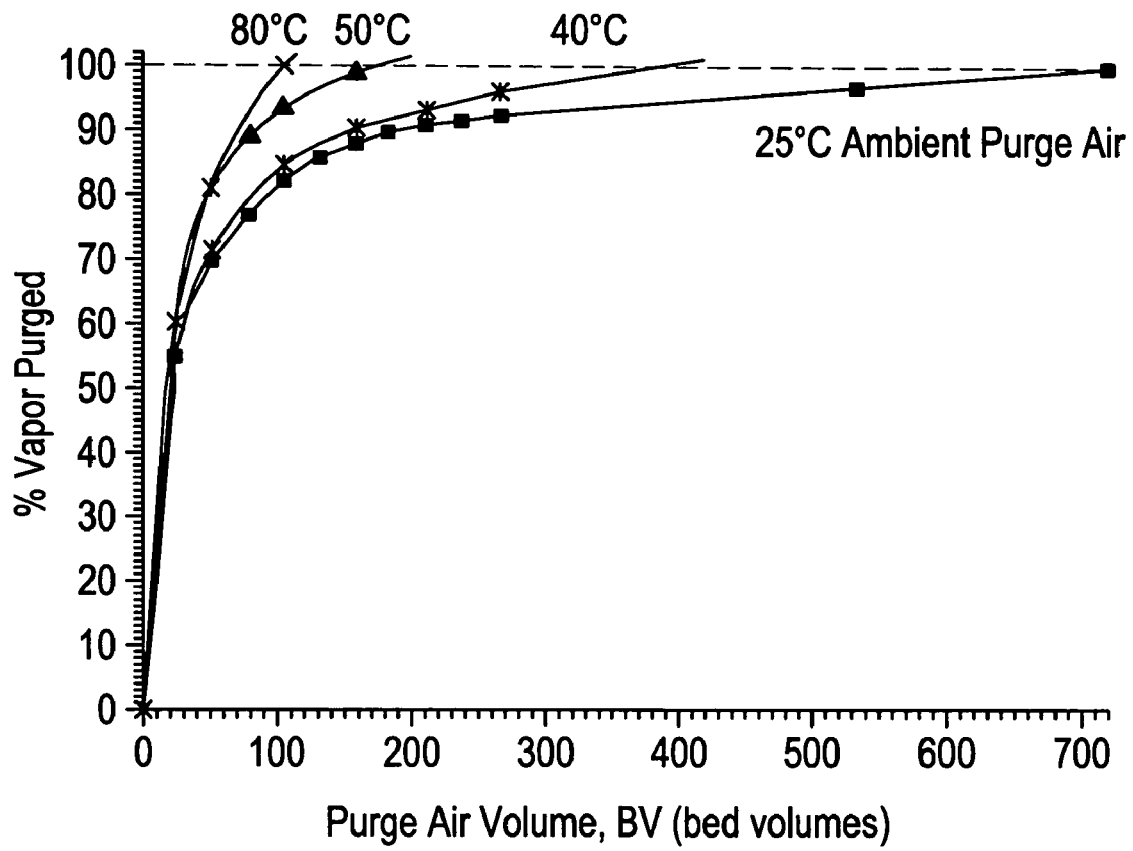

METHOD AND SYSTEM OF PURGING EVAPORATIVE EMISSION CONTROL CANISTER USING HEATED PURGE AIR

CROSS-REFERENCE TO RELATED APPLICATIONS

This application claims the benefit of priority under 35 U.S.C. § 102(e) to U.S. Provisional Application No. 60/614,135, filed Sep. 29, 2004, which is hereby incorporated by reference in its entirety.

FIELD OF THE INVENTION

The present invention relates to methods and systems for evaporative emission control for hybrid and non-hybrid vehicles, and more specifically to methods and systems for reducing and preventing vapor emissions from fuel tanks of such vehicles.

BACKGROUND OF THE INVENTION

Gasoline typically includes a mixture of hydrocarbons ranging from higher volatility butanes ($C_4$) to lower volatility $C_8$ to $C_{10}$ hydrocarbons. When vapor pressure increases in the fuel tank due to conditions such as higher ambient temperature or displacement of vapor during filling of the tank, fuel vapor flows through openings in the fuel tank. To prevent fuel vapor loss into the atmosphere, the fuel tank is vented into a canister that contains an adsorbent material such as activated carbon granules ("evap" canister).

The fuel vapor is a mixture of the gasoline vapor (referred to in this description also by its main component, hydrocarbon vapor) and air. As the fuel vapor enters an inlet of the canister, the hydrocarbon vapor is adsorbed onto activated carbon granules and the air escapes into the atmosphere. The size of the canister and the volume of the adsorbent activated carbon are selected to accommodate the expected gasoline vapor generation. After the engine is started, the control system uses engine intake vacuum to draw air through the adsorbent to desorb the fuel. The desorbed fuel vapor is directed into an air induction system of the engine as a secondary air/fuel mixture. One exemplary evaporative control system is described in U.S. Pat. No. 6,279,548 to Reddy, which is hereby incorporated by reference in its entirety.

When the gasoline tank is filled, fuel vapor accumulates in the canister. The initial loading may be at the inlet end of the canister, but over time the fuel vapor is gradually distributed along the entire bed of the adsorbent material. After the engine is started, a purge valve is opened and air is drawn through the canister. The air removes fuel vapor that is stored in the adsorbent material.

One problem encountered by such a system has been vapor breakthrough, or hydrocarbon emissions from the vented vapor adsorption canister, which is often referred to as canister bleed emissions. Such emissions may be, for example, about 20 mg hydrocarbons per day.

The problem of bleed emissions is particularly acute in hybrid vehicles. Hybrid vehicles combine a gasoline fueled internal combustion (IC) engine and an electric motor for better fuel economy. As will be appreciated, in a hybrid vehicle, the internal combustion engine is turned off nearly half of the time during vehicle operation. Because the purging of an evap canister takes place only during operation of the internal combustion engine when the desorbed vapor can be consumed in engine combustion, the evap canister purging with fresh air occurs less than half of the time the hybrid vehicle is running. Thus, although a hybrid vehicle generates nearly the same amount of evaporative fuel vapor as does a conventional vehicle, its lower purge rate may be insufficient to clean the adsorbed fuel out of the evap canister, thereby resulting in higher evaporative bleed or breakthrough emissions.

Accordingly, meeting the zero evap standard for hybrid vehicles is turning out to be particularly difficult. Some prior artisans have attempted to reduce breakthrough emissions by reducing the amount of vapor that is generated in the tank or that escapes the tank. For example, some hybrid systems use an expensive and complex semi-bladder tank for reducing tank vapor generation. The reduced tank vapor generation results in the need for a smaller evap canister, which in turn, can hopefully be sufficiently purged with the hybrid's lower purge air volume.

Regardless of its size, evaporative fuel stored in the evap canister needs to be purged and consumed in engine combustion. If the canister in not purged with a sufficient volume of purge air, as is problematic with hybrid vehicles, the canister bleed or breakthrough emissions will increase significantly once the canister is saturated.

Co-pending U.S. patent application Ser. No. 10/303,556, filed Nov. 25, 2002, which is hereby incorporated by reference in its entirety, describes a method and system for evaporative emission control in which bleed emissions from the evap canister are adsorbed by activated carbon fibers in a secondary canister (or further chamber of the evap canister) referred to generically as a "scrubber." The system may be used in a conventional automotive vehicle having only an internal combustion engine or in a hybrid vehicle that includes both an internal combustion engine and an electric motor. In an embodiment of the zero evap system, the system comprises a three-chamber canister and a small auxiliary hydrocarbon scrubber. The scrubber preferably comprises either a carbon monolith or an activated carbon fiber felt. A presently available scrubber for use with the present invention is a MeasWestvaco of the type described in U.S. Pat. No. 6,540,815. As will be appreciated, the composition of the adsorbents in the canister and scrubber are based on the composition of hydrocarbons being absorbed. The choice of materials for heated purge as described herein is within the ability of one of ordinary skill in the art armed with the present specification.

Typically, evaporative fuel vapor consists of about 50% hydrocarbons in the C4 to C10 range and the balance of the mixture being air. The main canister's activated carbon traps almost all of the hydrocarbons with the exception of small amounts of the more volatile components (C4 and C5) which escape with the air. The hydrocarbon scrubber is provided to trap these C4 and C5 components that escape from the main canister. This system may be effective in reducing breakthrough emissions to almost zero. However, both the scrubber and primary canister need to be purged with a sufficient amount of air to hinder bleed emissions. Accordingly, there remains a need in the art for effective purging of evap systems, and in particular, evap systems on hybrid vehicles.

SUMMARY OF THE INVENTION

An evaporative emission control system for a vehicle according to the present invention includes a fuel tank for storing a volatile fuel and an engine having an air induction system. A primary canister contains activated carbon granules as hydrocarbon adsorbent, a vapor inlet coupled to the fuel tank, a purge outlet coupled to the air induction system, and a vent/air inlet. The primary canister contains the adsorbent activated carbon granules in one or more chambers through which the fuel vapor passes between the vapor inlet and the vent/air inlet. The evaporative emission control system further includes an activated carbon fiber material or carbon monolith or any other suitable scrubber adsorbent, which could be contained in a further chamber of the primary canister, but more preferably, is contained in a separate scrubber in fluid communication with the vent/air inlet or the primary canister (or possibly contained in both a further chamber of the primary canister and in a separate scrubber). In describing this invention, the scrubber containing the activated carbon fiber or carbon monolith and the further chamber containing the activated carbon fiber or carbon monolith will be termed "scrubbers," with the scrubber being a "separate scrubber" and the further chamber being a "primary canister scrubber" unless context dictates otherwise.

The activated carbon materials adsorb fuel vapors when the engine is not running to reduce evaporative emissions and desorb fuel vapors when intake vacuum draws air through the scrubber and primary canister while the engine is running. The desorption regenerates the adsorptive capacity of the activated carbons. The activated carbon fiber material or carbon monolith is selected to adsorb butane and/or pentane isomer vapors that are in low concentrations in the air and to desorb the butane and/or pentane isomers. The activated carbon fiber or carbon monolith is capable of adsorbing such low concentrations of butane and/or pentane isomers than the activated carbon granules of the primary canister, while the activated carbon granules may be capable of adsorbing higher amounts of hydrocarbons overall, particularly when the hydrocarbons are more concentrated in the fuel vapor from the fuel tank.

The scrubber is preferably positioned near the exhaust system of the vehicle to provide for heated purging of the carbon fiber or carbon monolith. Alternatively, the purge air fluid line can be in contact with the exhaust system, for example near the muffler, to act as a heat exchanger for heating the purge air prior to entering the scrubber.

The evaporative emissions control system preferably uses carbon monolith or activated carbon granules that may be derived from wood and activated carbon fiber material derived from phenolic fibers, particularly novoloid fibers. In certain embodiments, the evaporative control system may reduce bleed emissions to below 5 mg/day, particularly below 2.0 mg/day.

The invention further provides a method for evaporative emission control for a fuel tank of a vehicle in which vapors from the fuel tank are first exposed to a quantity of activated carbon granules, and then any hydrocarbon vapors not adsorbed by the activated carbon granules ("bleed emissions") are exposed to an activated carbon fiber material or carbon monolith capable of adsorbing substantially all of the butane and pentane isomer contained in low concentrations in the air of the bleed emissions so that emissions from the fuel tank are reduced to less than about 5 mg per day. The activated carbon fiber material can desorb the adsorbed hydrocarbons when purged with exhaust heated purge air.

The invention further provides an evaporative emission control system for a vehicle in which evaporative emissions from the fuel tank first pass through activated carbon granules and then through activated carbon fiber material or carbon monolith. The activated carbon granules adsorb higher concentrations of fuel vapor, while the carbon fiber material or carbon monolith adsorbs the bleed emissions that are mainly butanes and pentanes, typically at very low concentrations (1 to 10,000 parts per million by volume in air). The carbon fiber material or carbon monolith is purged with exhaust heated purge air.

"About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art through this ordinary meaning, then "about" as used herein indicates a possible variation of up to 5% in the value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 10 is a graph demonstrating the correlation between purge air temperature and purge air volume in scrubber purging effectiveness.

DETAILED DESCRIPTION OF THE PREFERRED EMBODIMENTS

The following description of the preferred embodiment(s) is merely exemplary in nature and is in no way intended to limit the invention, its application, or uses.

Figure 1:
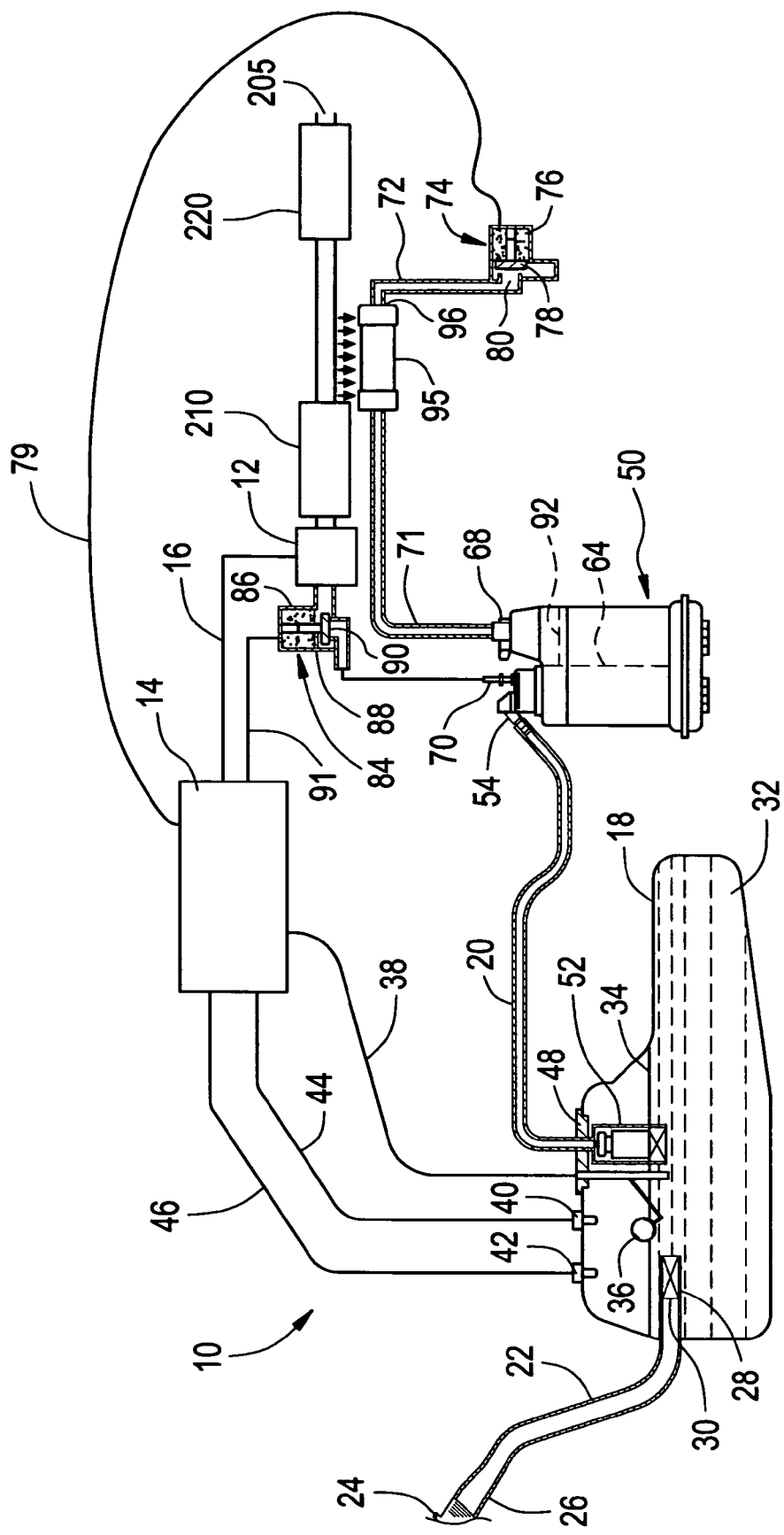
FIG. 1 is a functional block diagram of an evaporative control system for a vehicle having a primary canister and a scrubber positioned near the exhaust system of the vehicle to provide heated purge air.

Referring now to FIG. 1, an evaporative control system 10 for a vehicle including an engine 12 is illustrated. The vehicle may be a conventional, non-hybrid vehicle; but preferably is a hybrid vehicle that includes both an internal combustion engine and an electric motor (not shown). The engine 12 is preferably an internal combustion engine that is controlled by a controller 14. The engine 12 typically burns gasoline, ethanol, and other volatile hydrocarbon-based fuels. The controller 14 may be a separate controller or may form part of an engine control module (ECM), a power train control module (PCM) or any other vehicle controller.

When the engine 12 is started, the controller 14 receives signals from one or more engine sensors, transmission control devices, and/or emissions control devices. Line 16 from the engine 12 to the controller 14 schematically depicts the flow of sensor signals. During engine operation, gasoline is delivered from a fuel tank 18 by a fuel pump (not shown) through a fuel line (not shown) to a fuel rail. Fuel injectors inject gasoline into cylinders of the engine 12 or to ports that supply groups of cylinders. The controller 14 manages the timing and operation of the fuel injectors and the amount of fuel injected.

The fuel tank 18 is typically a closed container except for a vent line 20. The fuel tank 18 is often made of blow molded, high-density polyethylene provided with one or more gasoline impermeable interior layer(s). The fuel tank 18 is connected to a fill tube 22. A gas cap 24 closes a gas fill end 26 of the fill tube 22. The outlet end 28 of the fill tube 22 is located inside of the fuel tank 18. A one-way valve 30 prevents gasoline 32 from splashing out of the fill tube 22. An upper surface of the gasoline is identified at 34. A float-type fuel level indicator 36 provides a fuel level signal at 38 to the controller 14. A pressure sensor 40 and a temperature sensor 42 optionally provide pressure and temperature signals 44 and 46 to the controller 14.

The fuel tank 18 includes a vent line 20 that extends from a seal 48 on the fuel tank 18 to a primary canister 50. A float valve 52 within the fuel tank 18 prevents liquid gasoline from entering the vapor vent line 20. Fuel vapor pressure increases as the temperature of the gasoline increases. Vapor flows under pressure through the vent line 20 to the vapor inlet of the primary canister 50. The vapor enters canister vapor inlet 54 and diffuses into internal chambers containing activated carbon granules.

The primary canister 50 is formed of any suitable material. For example, molded thermoplastic polymers such as nylon are typically used. The details of an exemplary primary canister are disclosed in co-pending U.S. patent application Ser. No. 10/303,556, filed Nov. 25, 2002, which is hereby incorporated by reference.

A scrubber 95 containing activated carbon fiber material or carbon monolith is in fluid communication with vent opening 68 via vent line 71. The scrubber body may be made of aluminum alloy or any other good heat conducting material for better heat transfer from the exhaust system. The scubber body made of plastic material will not suitable for this concept. The details of an exemplary scrubber are also disclosed in co-pending U.S. patent application Ser. No. 10/303,556, filed Nov. 25, 2002, which is hereby incorporated by reference.

Air leaving the primary canister 50 flows through the scrubber 95. The activated carbon fiber material or carbon monolith adsorbs emissions contained in the air, particularly low concentrations of lower molecular weight hydrocarbons such as isomers of butane and/or pentane.

At the other end from the primary canister, scrubber 95 is connected through vent opening 96 to vent line 72 and solenoid actuated vent valve 74. The vent valve 74 is normally open as shown. A solenoid 76 moves a stopper 78 to cover the vent opening 80. The solenoid 76 is actuated by the controller 14 through a signal lead 79. The vent valve 74 is usually closed for diagnostic purposes only.

The purge outlet 70 is connected by a purge line (not shown) through a solenoid actuated purge valve 84 to the engine 12. The purge valve 84 includes a solenoid 86 and a stopper 88 that selectively close an opening 90. Purge valve 84 is operated by the controller 14 through a signal lead 91 when the engine 12 is running and can accommodate a secondary air/fuel mixture.

In operation, as an air/fuel mixture flows from the fuel tank 18 through the vent line 20 and the inlet 54 into the primary canister 50, hydrocarbons from the vapor are adsorbed by the activated carbon granules 58 in the primary canister 50. When the primary canister 50 becomes saturated, or when higher volatility hydrocarbons escape the primary canister 50 with the air, the hydrocarbons are routed through vent opening 68 into scrubber 95. The scrubber adsorbs the vast majority, if not all, remaining hydrocarbons exiting the primary canister.

Figure 3:
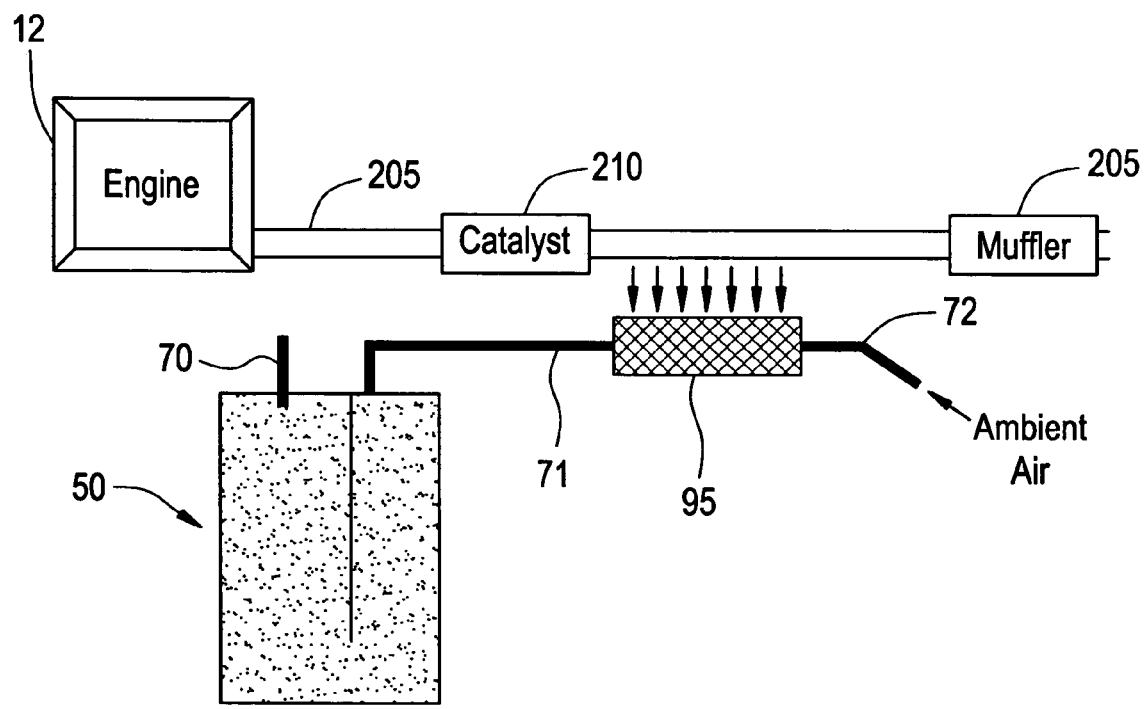
FIG. 3 is a functional block diagram of a primary canister containing activated carbon granules and a separate scrubber containing activated carbon fiber material positioned adjacent an area of the exhaust system of a vehicle between the engine and the muffler.

When the engine is operating, the controller 14 opens the purge valve 84 to allow air to be drawn past the vent valve 74. The air flows through the vent line 72 to the scrubber 95. In the embodiment depicted in FIG. 1, the scrubber 95 (or alternatively a canister scrubber) is operatively positioned near a portion of the vehicles exhaust system. As depicted best in FIG. 3, the scrubber 95 is preferably oriented longitudinally in an area parallel and adjacent the exhaust line 205 from the engine between the catalytic converter 210 and the muffler 220. Alternatively, any suitable orientation of the scrubber (or canister scrubber) or its positioning relative to the exhaust system to achieve the desired results are well within the skill of the ordinary artisan armed with the present specification. As will be appreciated, the positioning of the scrubber proximate the vehicles exhaust system allows for the purge air to be heated to increase the efficiency of the desorption of hydrocarbons.

The purge air and desorbed hydrocarbons pass through vent opening inlet 68 and the air is drawn through the primary canister canister 50. In other words, heated air flows through the activated carbon fiber material or carbon monolith of the scrubber and then passes through the activated carbon granules of the canister. Ultimately, the air becomes rich with desorbed hydrocarbons and exits through the purge outlet 70. The fuel-laden air is drawn through the purge line 82 and the purge valve 84 into the engine 12 for engine combustion.

While the exact composition of the absorption beds of the canister and scrubber is not critical to the invention, one suitable example of activated carbon granules for the canister is wood based activated carbon granules. For example, Westvaco wood carbon NUCHAR BAX-1500 is an exemplary, commercially available material. However, other activated carbon granules that are currently used in conventional canisters are also contemplated and within the scope of the invention.

In view of the fact that the bleed emissions from the primary canister primarily consist of butane and pentane isomers at very low concentrations, including butane, pentane, isobutane, and isopentane, the present invention contemplates use of an activated carbon fiber material or carbon monolith in the scrubber that is particularly suited to adsorb these light hydrocarbons at very low concentrations. Notably, the activated carbon granules that are typically used in current production canisters are not particularly suitable for adsorbing these light hydrocarbons because, while the activated carbon granules may be able to adsorb an overall higher amount of hydrocarbons, they are not as able to adsorb small-molecule hydrocarbons, such as the butane and pentane vapors of bleed emissions, or to efficiently adsorb such vapors at the low concentrations of bleed emissions.

Figure 2:
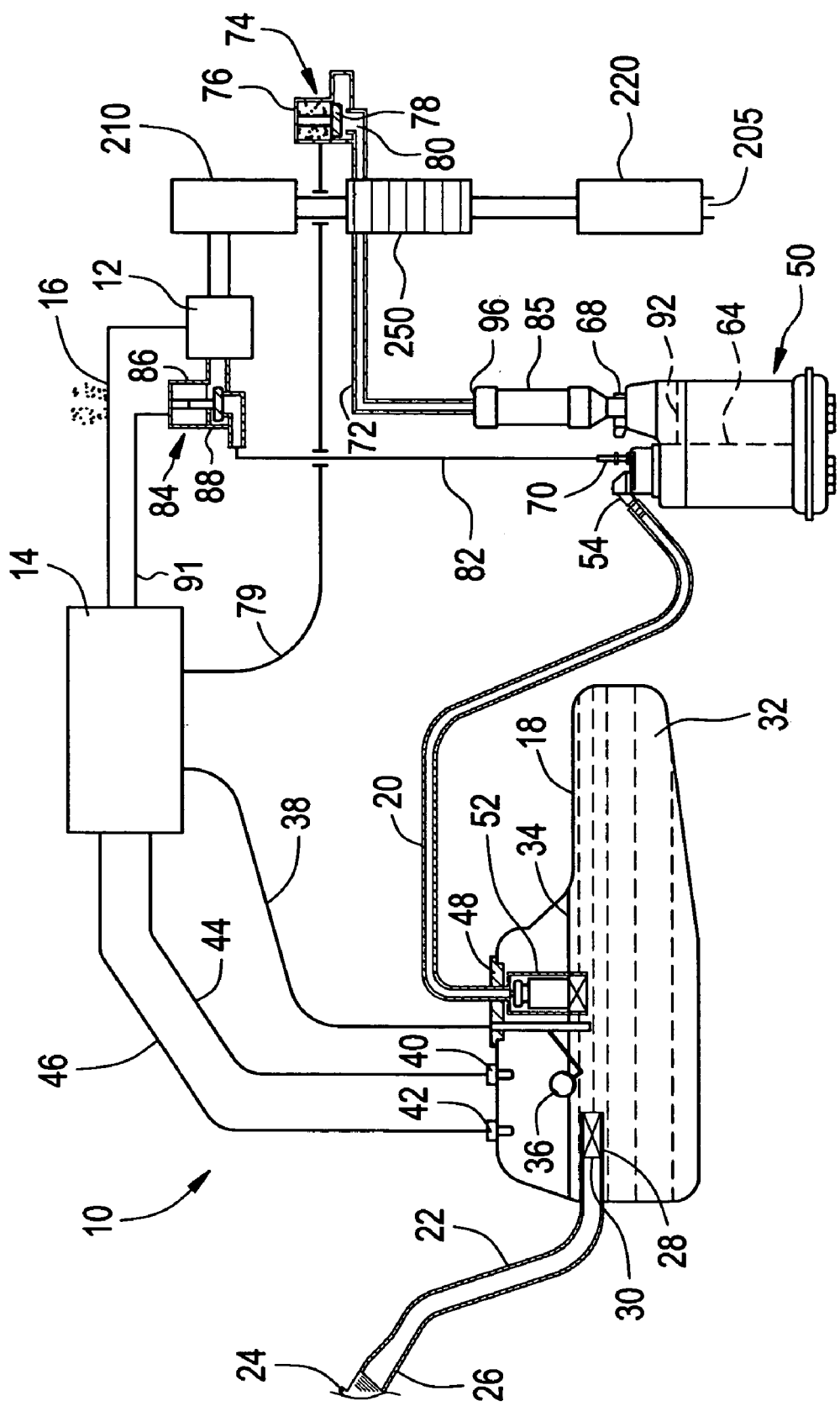
FIG. 2 is a functional block diagram of an evaporative control system for a vehicle having a primary canister and a scrubber having a heat exchanger portion operationally positioned around a portion of the exhaust system of the vehicle to provide heated purge air.

An alternative embodiment of an evaporative control system 10 for a vehicle including an engine 12 is illustrated in FIG. 2. As with the embodiment of FIG. 1, the vehicle may be a conventional, non-hybrid vehicle but is preferably a hybrid vehicle that includes both an internal combustion engine and an electric motor (not shown). Again, the engine 12 is preferably an internal combustion engine that is controlled by a controller 14 and burns gasoline, ethanol, and other volatile hydrocarbon-based fuels. As with the previous embodiment of FIG. 1, the controller 14 may be a separate controller or may form part of an engine control module (ECM), a powertrain control module (PCM) or any other vehicle controller.

Once again, in operation, as an air/fuel mixture flows from the fuel tank 18 through the vent line 20 and the inlet 54 into the primary canister 50, hydrocarbons from the vapor are adsorbed by the activated carbon granules in the primary canister 50. When the primary canister 50 becomes saturated, or when higher volatility hydrocarbons escape the primary canister 50 with the air, the hydrocarbons are routed through vent opening 68 into scrubber 95. The scrubber adsorbs the vast majority, if not all, remaining hydrocarbons exiting the primary canister. The scrubber can alternatively be a canister scrubber, or additional chamber, of the primary canister.

Figure 4:
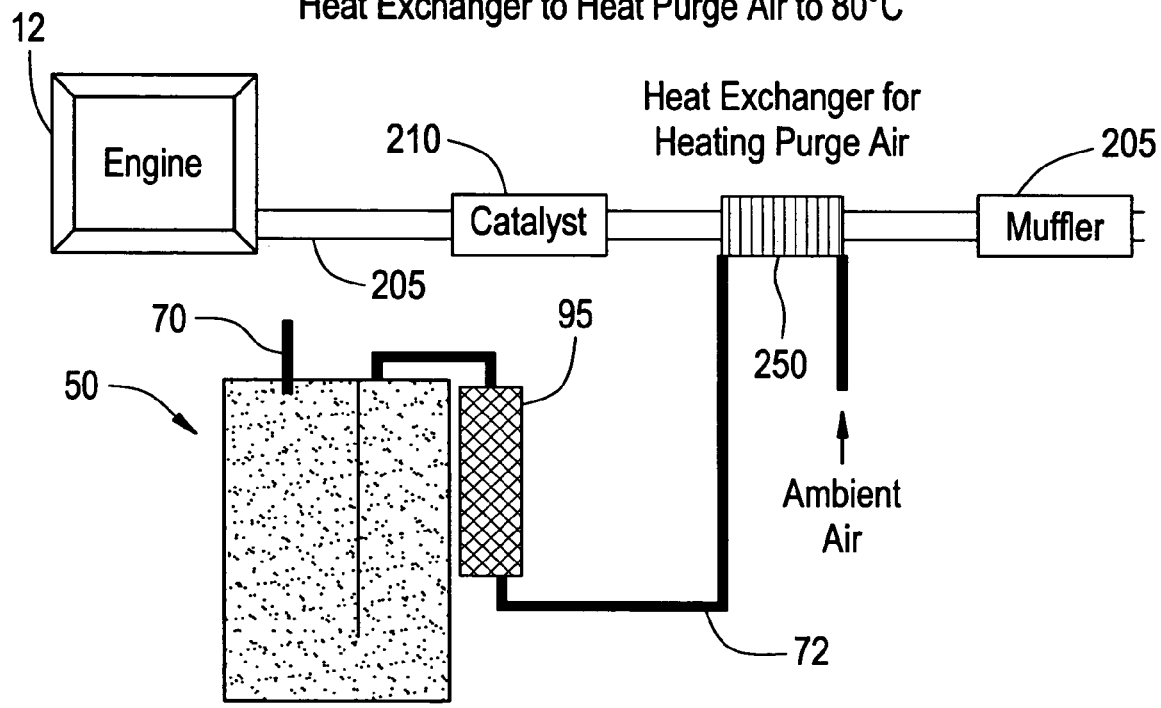
FIG. 4 is a functional block diagram of a primary canister containing activated carbon granules and a separate scrubber with a purge line wrapped around an area of the exhaust system of a vehicle between the engine and muffler.

In this alternative embodiment, when the engine is operating, the controller 14 opens the purge valve 84 to allow air to be drawn past the vent valve 74 into vent line 72. As best depicted in FIG. 4, vent line may be configured to surround the exhaust system piping to act as, or form, a heat exchanger 250. As will be appreciated, as air flows into the vent line 72 and through the heat exchanger 250 it is warmed to an effective temperature for purging the scrubber 95. The heat exchanger 250 is preferably disposed around an area between the catalytic converter and the muffler of the exhaust system. However, alternative positioning of the heat exchanger 250 portion is well with the skill of one of ordinary skill in the art armed with the present specification. Likewise, the size, configuration, and number of windings of the vent line 72 or heat exchanger 250 to achieve desired temperature or results is within the ability of the ordinarily skilled artisan.

The purge air and desorbed hydrocarbons pass through vent opening inlet 68 of the scrubber and the air is drawn through the primary canister 50. In other words, heated air flows through the carbon monolith scrubber and then passes from the scrubber through the activated carbon granules of the primary canister. The air becomes rich with desorbed hydrocarbons and exits through the purge outlet 70 and is drawn through the purge line 82 and the purge valve 84 into the engine 12 for engine combustion.

Internal testing of an embodiment of a prototype system of the present invention demonstrates the effectiveness of using exhaust heated purge air for desorbing a zero evap hybrid scrubber.

EXAMPLE 1

In a test, a 2-L canister and a 200 cc scrubber at 25° C. were purged with exhaust heated purge air. The canister included a mass of carbon 2000(0.3)=600 g, with a mass of heel of 100 g, and mass of adsorbed vapor (butane) of 50 g. The heat capacity of carbon is 0.3 cal/g° C. and the heat of desorption of butane is 92 cal/g.

A volume of 10 cubic feet of purge air (300 g) was heated to 100° C. using exhaust heat. The heat capacity of air is 0.24 cal/g° C. From heat balance calculation, the canister temperature increased from 25 to 28° C. when purged with the 10 cubic feet of 100° C. purge air. If the canister was empty (meaning no butane loading) the temperature increase would have been from 25 to 44° C.

Although not wishing to be bound by theory, the volume of the canister hinders the heat transfer temperature to which the canister will rise in the presence of exhaust heated purge air, and keeps the temperature of the canister's contents below a temperature sufficient to have much of an effect on purging.

Using the same exhaust heated purge air protocols, a 200 cc scrubber having a mass of carbon 200(0.3)=60 g and a mass of adsorbed vapor (butane) of 4 g was purged using 10 cubic feet of purge air (300 g) heated to 100° C. using exhaust heat. From heat balance calculation, the scrubber temperature increased from 35 to 81° C. when purged with the 10 cu ft of 100° C. purge air. If the scrubber was empty (no butane loading), the temperature would have increased to 85° C.

As the foregoing demonstrates, using heated purge air is very effective in increasing the temperature of the scrubber to >80° C., a temperature level that allows for rapid desorption of hydrocarbons, whereas, due to its much larger size, the relatively slight increase in temperature of the canister does not allow it to reach a temperature which greatly affects desorption.

EXAMPLE 2

Figure 5:
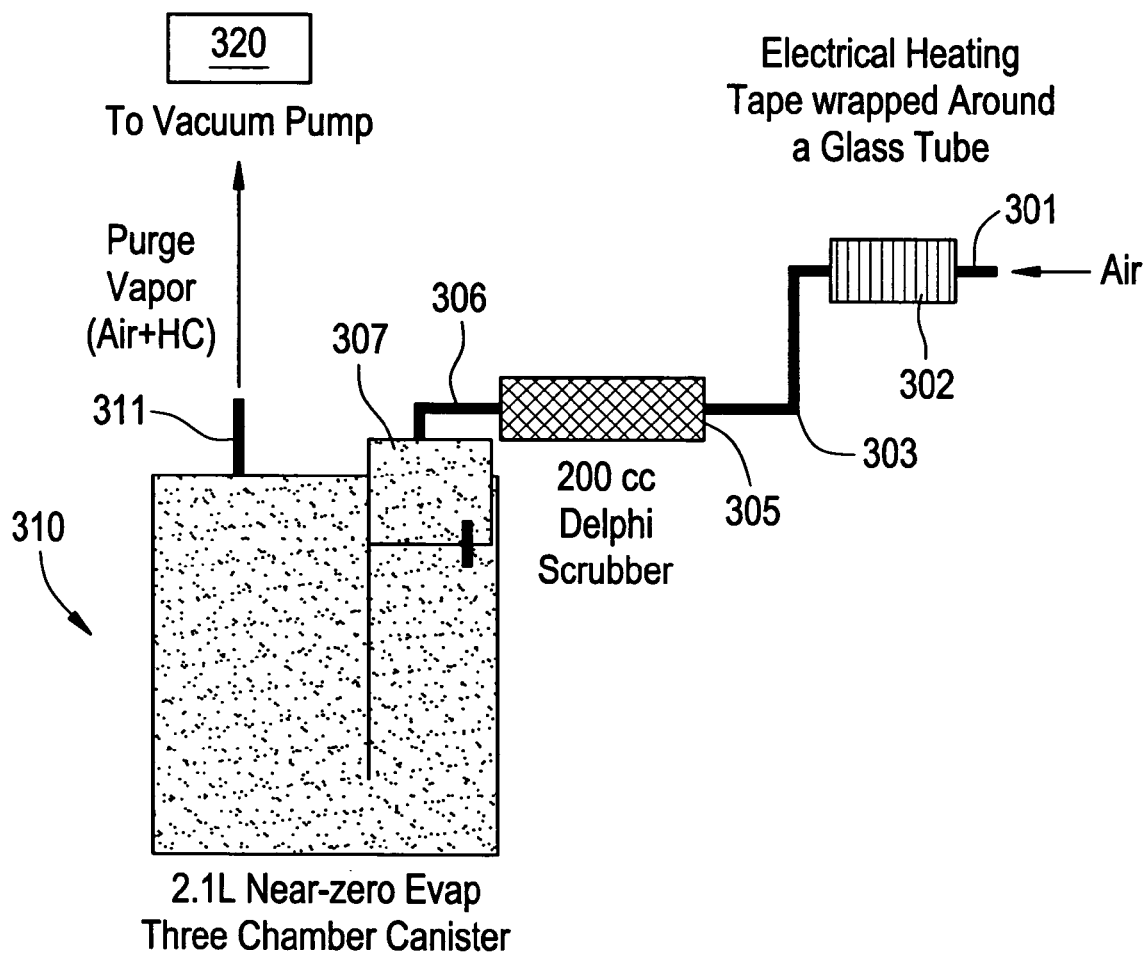
FIG. 5 is a diagram of an experimental set up used to test the effectiveness of using exhaust heated purge air for a low purge hybrid vehicle system.

Experiments were conducted to demonstrate the effectiveness of using exhaust heated purging of a low purge hybrid vehicle zero evap scrubber. A system to simulate the use of exhaust heated air is depicted in FIG. 5. As shown, air enters the system in the direction of arrow at intake 301. The air travels through heat exchanger 302. The heat exchanger comprises electrical heating tape wrapped around a glass tube. The air passing through the heat exchanger 302 travels through conduit 303 to a 200 cc carbon monolith scrubber 305. The scrubber 305 in turn includes a conduit 306 which communicates air into the entry 307 of a 2.1 L Near-zero evap three chamber canister 310. The canister in turn includes a purge vapor outlet 311 which is in communication with a vacuum pump 320 for applying negative pressure to the system to provide for the air flow rate.

Prior to the heated purge test, the canister 310 was loaded with a 50:50 butane/nitrogen mixture until it reached a 2 g breakthrough and soaked for 2 hours. The main canister and the scrubber adsorbed 110 g and 4.5 g of butane, respectively.

To simulate hybrid vehicle operation (engine on/off), the canister system was purged for 3 minutes and soaked for 2 minutes (no purge). This cycle was repeated until the purge air volume equaled 600 to 700 canister bed volumes (BV). For comparison purposes, as a standard, this test was repeated without any heat supplied into the purge air.

Figure 6:
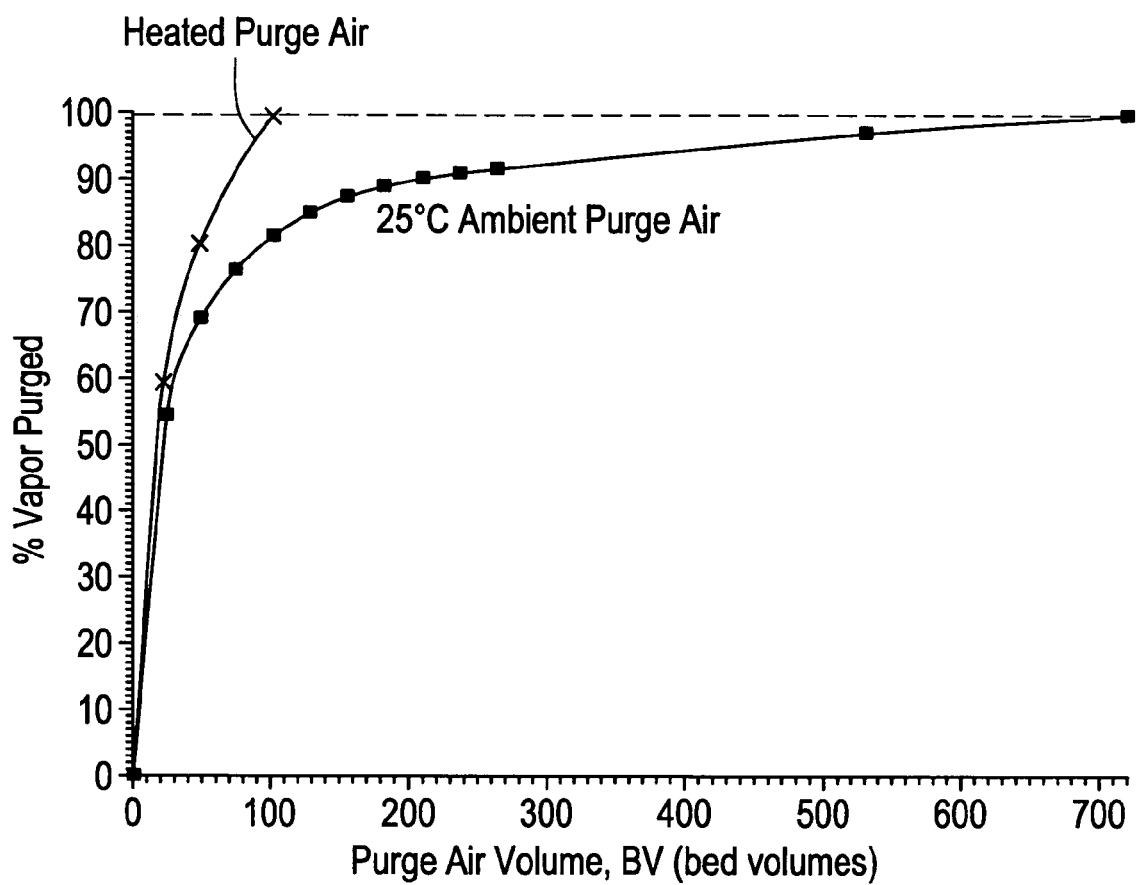
FIG. 6 is a graph plotting test results demonstrating the effectiveness of exhaust heated air for purging a zero evap hybrid scrubber.

FIGS. 6–10 are various charts depicting the results of the above experiment. FIG. 6 is a graph demonstrating the effectiveness of exhaust heated air for purging a zero evap hybrid scrubber. As can be discerned from the graph, when the system was purged using heated air, it took only about 100 BV purge to clean the scrubber. By contrast, when the air was not heated, it took more than 600 BV purge to clean the scrubber.

Figure 7:
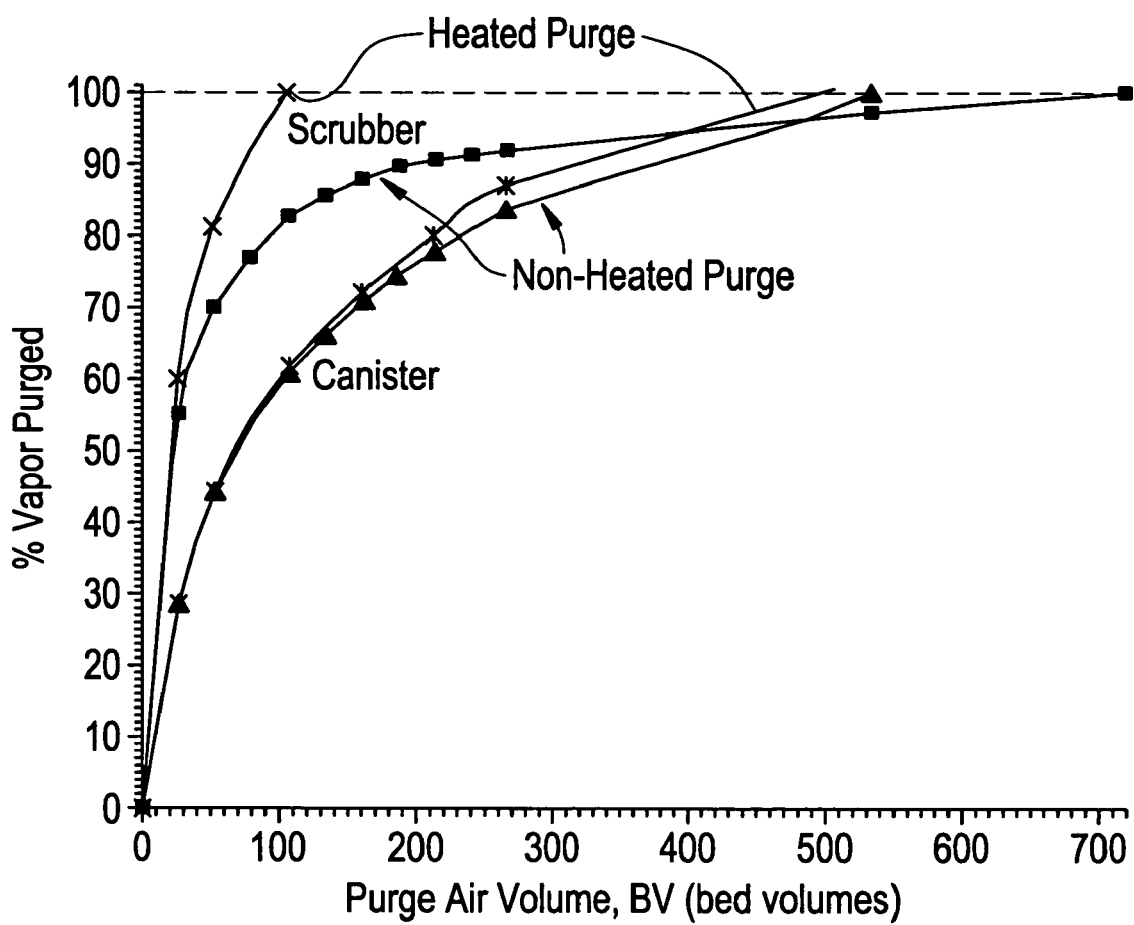
FIG. 7 is a graph of test results demonstrating the minor effect of purging a zero evap hybrid primary canister with heated air.

FIG. 7 is a graph demonstrating that the heated purge had little effect on the purging of the main canister.

Figure 8:
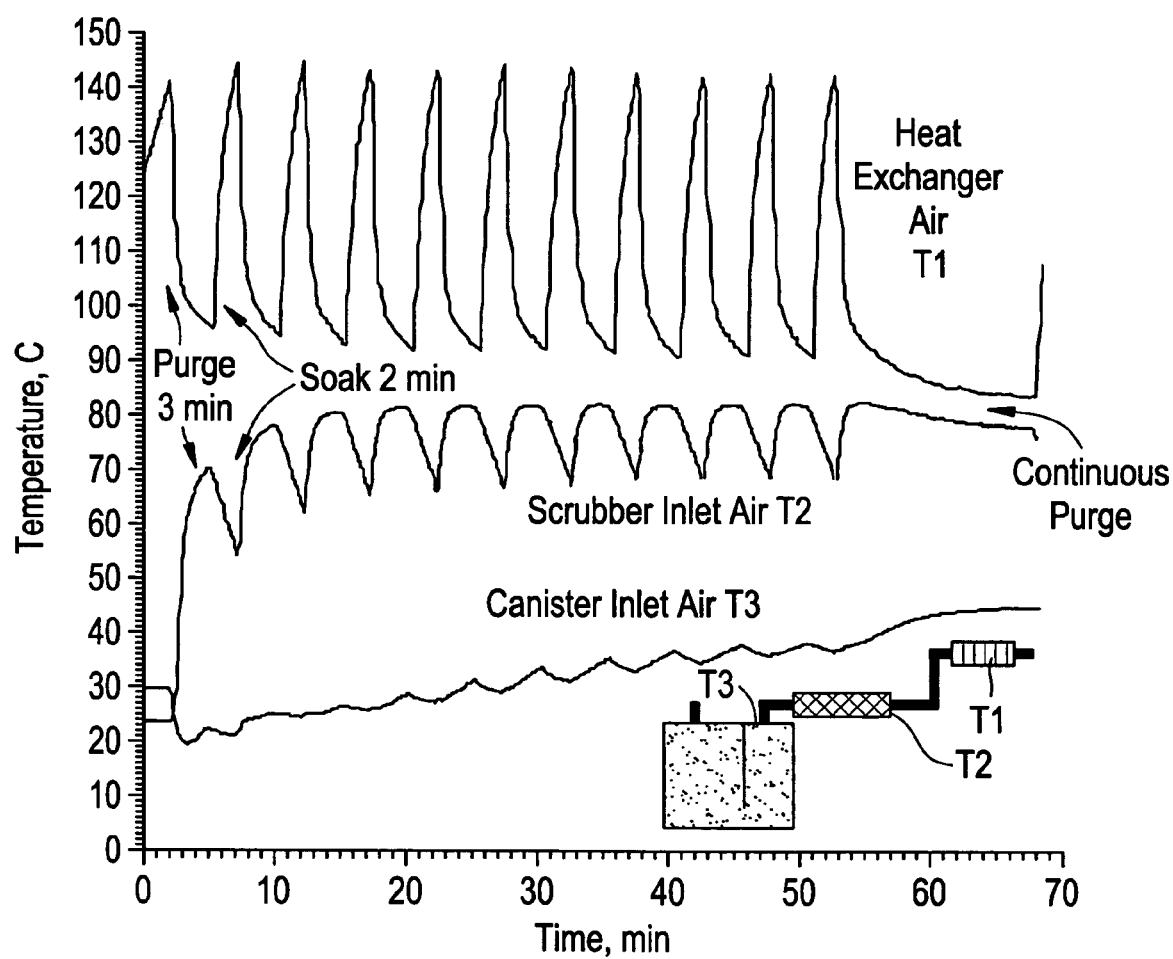
FIG. 8 is a graph of exhaust heated purge air temperatures during testing of an embodiment of the invention.
Figure 9:
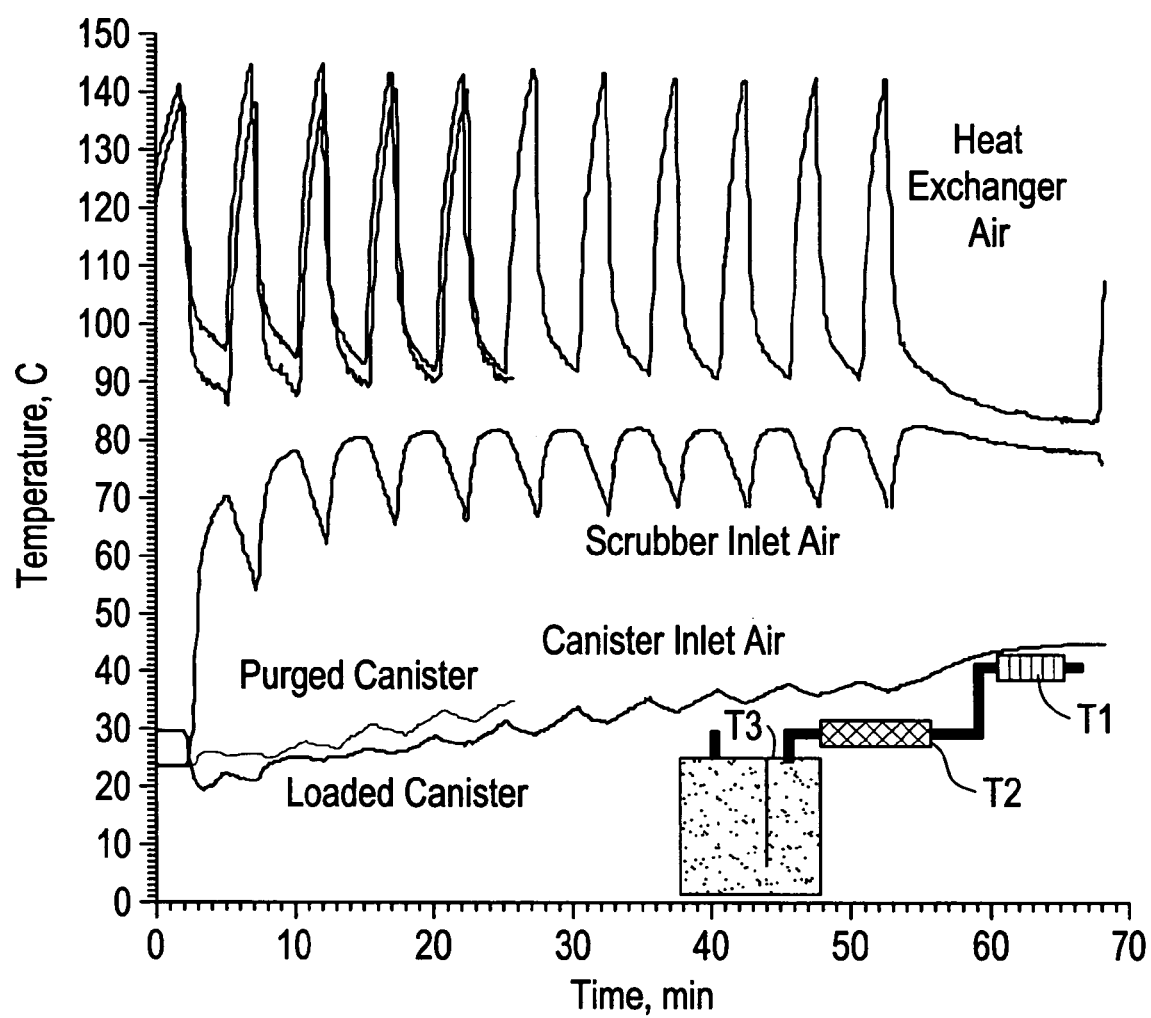
FIG. 9 is a graph comparing purged canister and loaded canister exhaust heated purge air temperatures during testing of an embodiment of the invention.

FIG. 8 is a graph plotting the temperatures recorded at various locations in the purge system. As shown, the heat exchanger temperature decreased to about 90° C. during 3-minute purge and increased to about 140° C. during the 2-minute soak. As also shown, the scrubber inlet temperature increased to about 80° C. during the purge and decreased to about 65° C. during soak. Finally, as discernable, the canister temperature decreased initially during vapor desorption and increased slowly during heated air purge. In this regard, FIG. 9 compares the temperatures of loaded versus purged canisters.

Additional experimentation demonstrated the relationship between purge air volume and purge air temperature. FIG. 10 is a graph charting purge air volume (or bed volumes) with the percentage of vapor desorbed when purge air is heated to 40° C., 50° C. and 80° C. (and unheated 25° C. purge air as a baseline standard). The results depicted on FIG. 10 show that the bed volumes of purge air required to clean the scrubber is a function of the purge air temperature. For example, if the available purge is 110 BV, the air must be heated to 80° C. for complete purging of the scrubber, whereas, if the available purge is 170 BV, then the air need only be heated to 50° C. (instead of 80° C.) for complete purging. Although the relationship between the volume of purge air and the purge air temperature is not linear, one of ordinary skill in the art armed with the present specification can devise a system to help ensure more complete cleaning of the scrubber. For example, in climates or conditions where it is predicted that the internal combustion engine will run less regularly than the electric engine, a heat exchanger can be devised to heat the available air to a temperature that allows for fewer bed volumes of air to purge the scrubber. Likewise, for example, in climates or conditions where it is predicted that the internal combustion engine will run more regularly (and thus more purge air volumes are available), there is no need to provide a heat exchanger to heat the air when positioning near the exhaust system will be effective.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An evaporative emission control system comprising a hydrocarbon scrubber comprising a body, and a carbon material contained in the body constructed and arranged to adsorb low molecular weight hydrocarbons in a vapor stream from a vehicle fuel tank;
a combustion engine exhaust system, and wherein a portion of the exhaust system is constructed and arranged to transfer heat through the scrubber body and to heat purge air flowing through the scrubber and so that low molecular weight hydrocarbons are desorbed from the carbon material.

2. The evaporative emission control system of claim 1, further comprising a canister comprising activated carbon granules for adsorbing high molecular weight hydrocarbons in the vapor stream.

3. The evaporative control system of claim 1, wherein said carbon material is an activated carbon fiber material or carbon monolith.

4. The evaporative emission control system of claim 1, wherein said evaporative emission system has bleed emissions below 3 mg/day.

5. An evaporative emission control system for a vehicle, comprising:
a fuel tank for storing a volatile fuel;
a first canister comprising one or more chambers comprising activated carbon granules, said canister comprising a vapor inlet coupled with the fuel tank, a purge inlet coupled to an air induction inlet for en engine, and an air inlet, wherein said one or more chambers are located between the vapor inlet and the air inlet; and
a scrubber comprising activated carbon fiber material or carbon monolith, said scrubber being either a further chamber of the canister located between a last chamber comprising activated carbon granules and the air inlet or a separate second canister coupled to said air inlet, wherein said scrubber is positioned to supply heated purge air to said chamber comprising activated carbon granules;
a combustion engine exhaust system, and wherein a portion of the exhaust system is constructed and arranged to heat purge air, the purge air flowing through the scrubber so that low molecular weight hydrocarbons are desorbed from the activated carbon fiber material or carbon monolith of the scrubber.

6. The evaporative emission system of claim 5, wherein said scrubber body comprises aluminum.

7. The evaporative emission system of claim 6, wherein said scrubber is positioned adjacent an exhaust line of said vehicle in an area between a catalytic converter and a muffler of said exhaust system.

8. The evaporative emission system of claim 5, further comprising a heat exchanger for heating purge air.

9. The evaporative emission system of claim 8, wherein said heat exchanger comprises a portion of a purge air vent line wrapped around an exhaust conduit of said vehicle.

10. The evaporative emission control system of claim 9, wherein said vent line is wrapped around said exhaust conduit in an area between a catalytic converter of said vehicle's exhaust system and a muffler of said vehicle's exhaust system.

11. The evaporative emissions system of claim 5, wherein said evaporative emissions system has bleed emissions below 5 mg/day.

12. An evaporative emission control system for a vehicle according to claim 5, wherein the vehicle is a hybrid vehicle further comprising an electric motor.

13. A method for reducing bleed emissions from an evaporative emission control system for a vehicle, comprising venting the evaporative emission control system to a hydrocarbon scrubber capable of adsorbing low molecular weight hydrocarbon vapors in low concentrations in air and capable of desorbing the adsorbed low molecular weight hydrocarbons, heating purge air with heat from an exhaust system of the vehicle and flowing the heated purge air through the scrubber to desorb the low molecular weight hydrocarbons from the scrubber.

14. The method of claim 13, further comprising venting the evaporative emission control system to a canister having one or more chambers of adsorbent material prior to venting said system to said scrubber;
   opening a vent line for passing purge air through said scrubber; and
   venting said purge air and desorbed hydrocarbons to said vehicle's internal combustion engine.

15. The method of claim 13, further comprising venting the evaporative emission control system to a canister having one or more chambers of adsorbent material prior to venting said system to said scrubber;
   opening a vent line for passing purge air through said scrubber;
   and wherein the heating purge air comprises heating ambient air using heat generated by said vehicle's exhaust system during operation;
   and thereafter purging said canister with the heated purge air to desorb the adsorbed hydrocarbons; and
   venting said purge air and desorbed hydrocarbons to said vehicle's internal combustion engine.

16. The method of claim 13, wherein said vehicle is a hybrid vehicle.

17. The method of claim 13, wherein said evaporative emissions system has bleed emissions below 5 mg/day.

18. A method for reducing emissions from a vehicle having a fuel tank, comprising:
   passing fuel/air vapor comprising low and high molecular weight hydrocarbons from the fuel tank first through a quantity of activated carbon granules to adsorb high molecular weight hydrocarbons and then through a quantity of an activated carbon fiber material or carbon monolith to adsorb low molecular weight hydrocarbons;
   wherein said quantity of activated carbon granules is capable of adsorbing a desired amount of fuel vapor;
   and further wherein said quantity of activated carbon fiber material or carbon monolith is capable of adsorbing low molecular weight hydrocarbons vapor contained in concentrations of less than 10,000 parts per million by volume in air so that emissions from the fuel tank are reduced to less than about 5 mg per day,
   and heating purge air with heat from a vehicle exhaust system to desorb low molecular weight hydrocarbons from the activated carbon fiber material or carbon monolith.

19. The method according to claim 18, wherein the activated carbon fiber material or carbon monolith is enclosed in a housing comprising aluminum.

20. The method according to claim 18, wherein the low molecular weight hydrocarbons comprise at least one of butane or pentane.

* * * * *